United States Patent [19] [11] 4,247,607
O'Boyle [45] Jan. 27, 1981

[54] LITHIUM HALIDE PRIMARY CELL HAVING END OF LIFE INDICATOR MEANS

[75] Inventor: Matthew O'Boyle, Timonium, Md.
[73] Assignee: Catalyst Research Corporation, Baltimore, Md.
[21] Appl. No.: 144,329
[22] Filed: Apr. 28, 1980
[51] Int. Cl.³ ............................................. H01M 4/36
[52] U.S. Cl. ..................................... 429/101; 429/218
[58] Field of Search ............................... 429/101–104, 429/218, 199

[56] References Cited
U.S. PATENT DOCUMENTS 3,817,791  6/1974  Greatbach et al. .................. 429/101
3,874,929  4/1975  Greatbach ....................... 429/101 X
3,994,747  11/1976  Greatbach et al. .............. 429/101 X Primary Examiner—Charles F. LeFevour
Attorney, Agent, or Firm—Reed, Smith, Shaw & McClay

[57] ABSTRACT

The present invention relates to a lithium halide primary cell having means to indicate its end of life. The cell includes at least one lithium anode and a cathode in contact with a major surface of the anode wherein the indicating means comprises a stepped portion on the major surface of said anode which is not in contact with the cathode. The stepped portion of the anode comprises a surface area of from about 40 to 60% of the area of the major surface in contact with the cathode and about 15 to 5% of the total thickness of said anode.

4 Claims, 2 Drawing Figures

LITHIUM HALIDE PRIMARY CELL HAVING END OF LIFE INDICATOR MEANS

FIELD OF THE INVENTION

The present invention relates to lithium halide batteries, and, in particular, to lithium halide batteries adapted for use in cardiac pacer devices.

BACKGROUND OF THE INVENTION

Lithium halide batteries have become well known for their extended shelf life and suitability as the power source in cardiac pacer devices. Normally these batteries utilize a lithium anode and an organic charge transfer complex with an excess halide as the cathode material. U.S. Pat. Nos. 3,660,163, 3,674,562, and 4,148,975 are illustrative of such cells.

Because of the long life associated with such batteries, it is desirable to have a method for indicating the amount of life remaining. This is particularly important in cardiac pacer devices so as to afford adequate time for the surgical removal of the power source before it dies. It is, therefore, an object of the present invention to provide a means within the battery for positively indicating the remaining life of such batteries without requiring any modification to the electronic circuitry of the pacer device. It is a further object to the present invention to provide a battery whereby it is possible to determine the remaining energy available, which can be interpreted into remaining time, regardless of the previous service to which the cell had been subjected.

SUMMARY OF THE INVENTION

Generally, the present invention is adaptable to lithium halide batteries having at least one lithium anode, one of the major surfaces of which is contact with a depolarizer such as the depolarizer disclosed in U.S. Pat. No. 4,148,975. The invention comprises a stepped portion on the major surface not in contact with the depolarizer. The stepped portion comprises about 15 to 5% of the total thickness of the anode and has a surface area of from about 40 to 60% of the surface area of the major surface in contact with the depolarizer. In a preferred embodiment of the present invention, the thickness of the step portion of the anode comprises approximately 10% of the total thickness of the anode and has a surface area of about 50% of the surface area of the major surface in contact with the depolarizer.

It has been found that the surface area of the electrolyte formed at the inner face between the anode and depolarizer is proportional to the internal impedance of the cell at any time during discharge. The stepped portion having the preferred dimensions results in a doubling of the resistance at that point in time when only 10% of the unused lithium anode remains. This increase in the internal impedance of the cell occurs suddenly, and is detectable by a physician observing a significant drop in the heart stimulation rate afforded by the pacer device. By providing such indication when 5 to 15% of the lithium anode remains unused there is sufficient time to replace the battery before its end of life. Other advantages of the present invention will become apparent from a perusal of the following detailed description of a presently preferred embodiment taken in connection with the accompanying drawings.

BRIEF DESCRIPTION OF THE INVENTION

Figure 1:
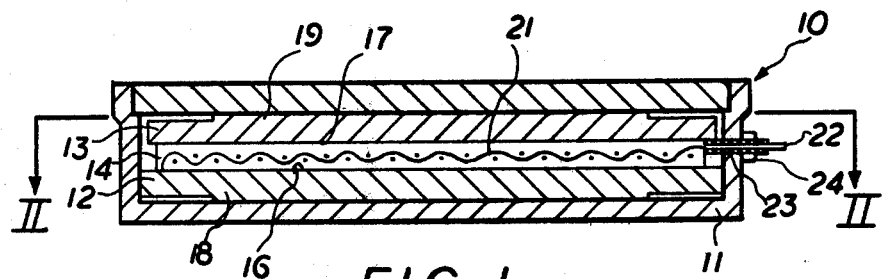
FIG. 1 is a sectional elevation of the battery taken along line I—I of FIG. 2.
Figure 2:
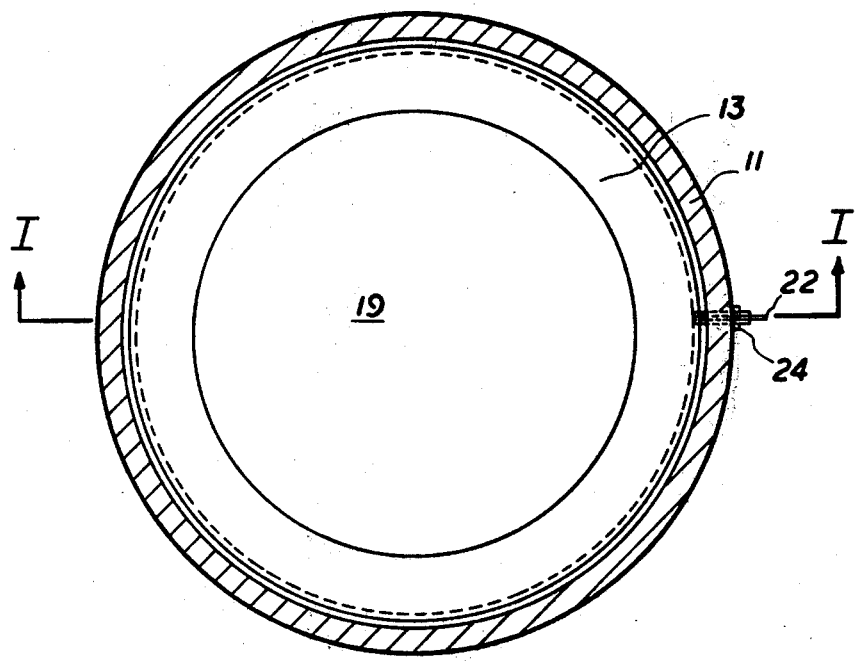
FIG. 2 is a sectional plan view of a cell taken along line II—II of FIG. 1.

Referring to FIGS. 1 and 2, battery 10 of the present invention comprises an outer encasement member 11, preferably made from stainless steel and shaped in the form of a cup to facilitate assembly. A pair of lithium anode discs 12 and 13 are positioned in member 11 with depolarizer 14 interposed between said anodes. Lithium disc 12 and 13 are of a configuration substantially conforming to the interconfiguration of encasement numer 11 to achieve a tight fit for electrical contact. Lithium anodes 12 and 13 include first major surfaces 16 and 17, respectfully, in contact with depolarizer 14 and whereat a lithium halide electrolyte forms in situ. Anodes 12 and 13 also include stepped portions 18 and 19, respectfully;

Preferably, the surface area of each stepped portion 18 and 19 is equal to one half the surface area of each of the first major surfaces 16 and 17, respectfully, of the associated anode. It is to be understood, however, that the effect of the difference in surface area is to create a sudden increase in the internal impedance of the cell to be detected by a physician measuring the heart stimulation rate provided by a cardiac pacer device. It is clear that a change in surface area 40 to 60% would also provide useful information. However, a stepped portion having a surface area outside of said 40 to 60% range would also provide a detectable indication of end of life but with certain disadvantages. With an area less than 40% there would be a noticeable loss in cell capacity whereas a stepped portion greater than 60% would result in increasingly less discernable signals.

In the preferred embodiment, therefore, the stepped portion comprises from 5 to 10% of the total thickness of the associated anode. Most desirably, the stepped portion represents approximately 10% of the total thickness so that the increase in the internal impedance of the battery occurs at a point where 90% of the useful life of the cardiac power source has been utilized. It is contemplated that where the stepped portion comprises less than 5% of the anode thickness; that is a representation that 95% of the cell has been utilized, does not provide sufficient time for safe replacement of the cell, while greater than 15% of the total thickness, representing 85% of the cell has been used is greater than needed and wasteful. Most desirably, therefore, stepped portions 18 and 19 comprise 10% of the total thickness of respective anodes 12 and 13 and have a surface area approximately 50% of the associated major surfaces 16 and 17, respectfully.

As shown depolarizer 14 includes a cathode current collector comprising of a metal screen 21 made, for example, of nickel and having cathode lead 22 electrically connected thereto. Cathode lead 22 is sheathed in an insulating material such as Halar ® and is routed through opening 23 in encasement member 11 and sealed in said opening by means of glass or ceramic seal 24. Preferably, depolarizer 14 is made in accordance with U.S. Pat. No. 4,148,975, incorporated herein by reference.

While lithium anodes 12 and 13 have been shown and described as discs, it is to be understood that the invention is equally applicable to other anode configurations.

Also, stepped portions 18 and 19 have been shown as discs, but it is to be understood that such portions may comprise any configuration within the claimed limitations. Thus, while presently preferred embodiment of the invention have been described and shown in particularity, the invention may be otherwise embodied in the scope of the appended claim.

What is claimed is:

1. A lithium halide primary cell comprising an encasement member; at least one lithium anode positioned within and in contact with said encasement member, said anode having two major surfaces one of which is adapted to be in contact with a cathode, said other major surface having a stepped portion comprising from 15 to 5% of the total thickness of said anode and from 40 to 60% of the area of said major surface; a cathode positioned in contact with said major surface of said anode but not in electrical contact with said encasement means; and a terminal in electrical contact with said cathode.

2. A lithium halide primary cell as set forth in claim 1 wherein said cell comprises first and second lithium anodes.

3. A lithium halide primary cell has set forth in claims 1 or 2 wherein said stepped portion comprises 10% of the total thickness of the associated anode and 50% of said surface.

4. A lithium halide primary cell as set forth in claims 1 or 2 wherein said lithium anode is in the form of a disc.

* * * * *